Sept. 13, 1949.  C. W. WARD  2,481,549
RIGHT TRIANGLE SOLVING DEVICE
Filed July 24, 1946  4 Sheets-Sheet 2

INVENTOR.
CHARLES W. WARD
BY Clade Koontz and
Raymond J. Crowley
ATTORNEYS

Sept. 13, 1949. C. W. WARD 2,481,549
RIGHT TRIANGLE SOLVING DEVICE
Filed July 24, 1946 4 Sheets-Sheet 3

INVENTOR.
CHARLES W. WARD
BY
ATTORNEYS

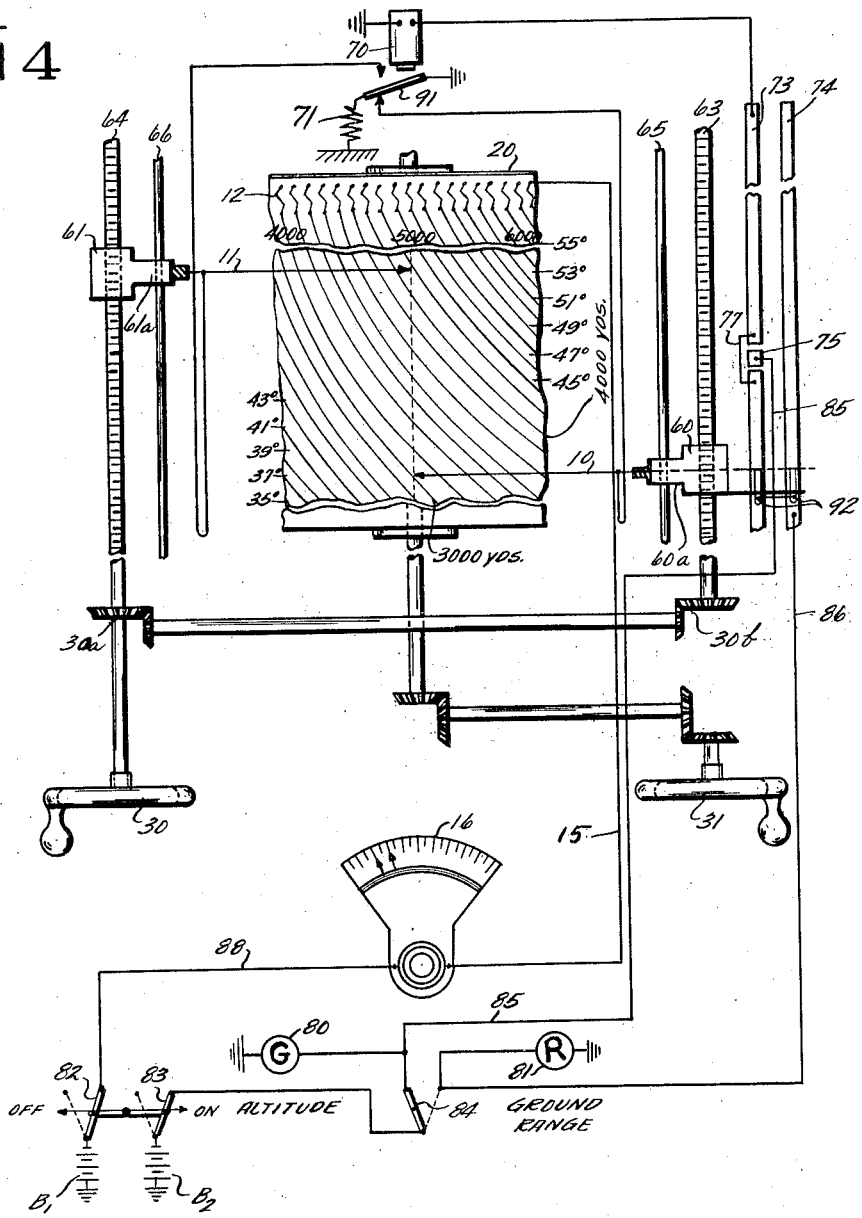

Patented Sept. 13, 1949

2,481,549

UNITED STATES PATENT OFFICE 2,481,549

RIGHT TRIANGLE SOLVING DEVICE

Charles W. Ward, Bradenton, Fla.

Application July 24, 1946, Serial No. 685,885

3 Claims. (Cl. 235—61)

(Granted under the act of March 3, 1883, as amended April 30, 1928; 370 O. G. 757)

The invention described herein may be manufactured and used by or for the Government for governmental purposes without payment to me of any royalty thereon.

This invention relates to a method of computing data necessary for the indicating or display system of radar sets and particularly to systems whereby all desired indications are read directly by the radar operator.

A radar set depends for its operation upon the fact that any object will, if struck by a beam of high frequency radiation, reflect a portion of that radiation to the point of origin of the beam. The reflected signals or echoes are detected by suitable receivers in the radar set and, by the use of specially designed electronic circuits, furnish the desired information on distance, direction and elevation of the object from which they were reflected.

The main object of my invention is to eliminate expensive electronic circuits from the computing and indicating system of radar sets and substitute conventional electro-mechanical apparatus so as to provide a very simple, inexpensive indicating system at a fraction of the cost of those now in use on radar sets without impairing its efficiency.

Radar systems vary greatly in detail. They may be very simple or highly refined. The principles of operation, however, are essentially the same and consist of three functional systems: the transmitting system; the receiving system; and the indicating or display system.

Searching, detecting and tracking functions are performed by the transmitting system in various manners. After the antenna has been positioned so that an object is detected by the receiving system, the slant range, azimuth and elevation information is presented to the indicating system.

Azimuth and elevation indications are usually given in tenths of degrees. All indications of slant range and altitude are presented according to a predetermined unit of measurement, usually yards or miles. For illustrative purposes in describing my invention, "yards" will be used as the unit of measurement.

As the operational functions of transmitting and receiving radar signals is beyond the scope of this invention, I will confine the circuits and specifications to the indicating or display system of radar sets. The functions of all contemplated indications together with a brief description of their utility follows.

The azimuth angle of a detected object is its horizontal clockwise displacement with respect to a specified reference direction from the radar set. This information gives the radar operator the compass point direction of detected aircraft.

The slant range of a detected object is also supplied by the radar set and is the direct, or line of sight distance between it and a reference point on the radar set. This information gives the radar operator the direct line of sight distance between him and the detected object. This is one of the two indications necessary to compute altitude and ground range.

The angle of elevation of a detected object is its vertical angular displacement above the level of a reference point on the radar set. This information gives the radar operator the vertical angular displacement of the detected aircraft. This is the other of the two indications necessary to compute altitude and ground range. Angle of elevation information usually comes from the angular position of the antenna of the radar set.

The altitude of a detected object is its height directly above a point level with a reference point on the radar set. Altitude is one of the indications necessary in gun directing or search light detection of aircraft, also the radar operator uses this information in advising the aircraft pilot of his height above the ground to aid blind landing in unfavorable weather. This information is also valuable in checking the aircraft altimeter. Altitude must be computed from the slant range and elevation data received at the radar set.

The ground range of a detected object is the horizontal distance between a reference point on the radar set and a point directly under the aircraft. This information is valuable as it enables the radar operator to locate a position on his map directly under the aircraft, thereby enabling him to instruct the pilot of a bomber when to drop his bombs or advise him in which direction to move so that he may release his bombs over a predetermined objective, or this information transmitted by the radar operator to the aircraft pilot may be used to accurately direct the pilot to a safe landing area.

Because of the complicated electronic circuits now in use, ground range indications are included in only a few of the present radar sets. The principal object of the invention therefore is to provide a simple apparatus capable of computing and indicating both altitude and ground range from slant range and elevation angle data obtained from a radar set.

My invention will be better understood from the following description when taken in connection with the accompanying drawings and its scope will be pointed out in the appended claims.

Referring to the drawings:

Fig. 4 is a schematic wiring diagram of the circuits employed for computing and indicating both altitude and ground range from elevation and slant range readings of an object detected by a radar set.

Figure 1:
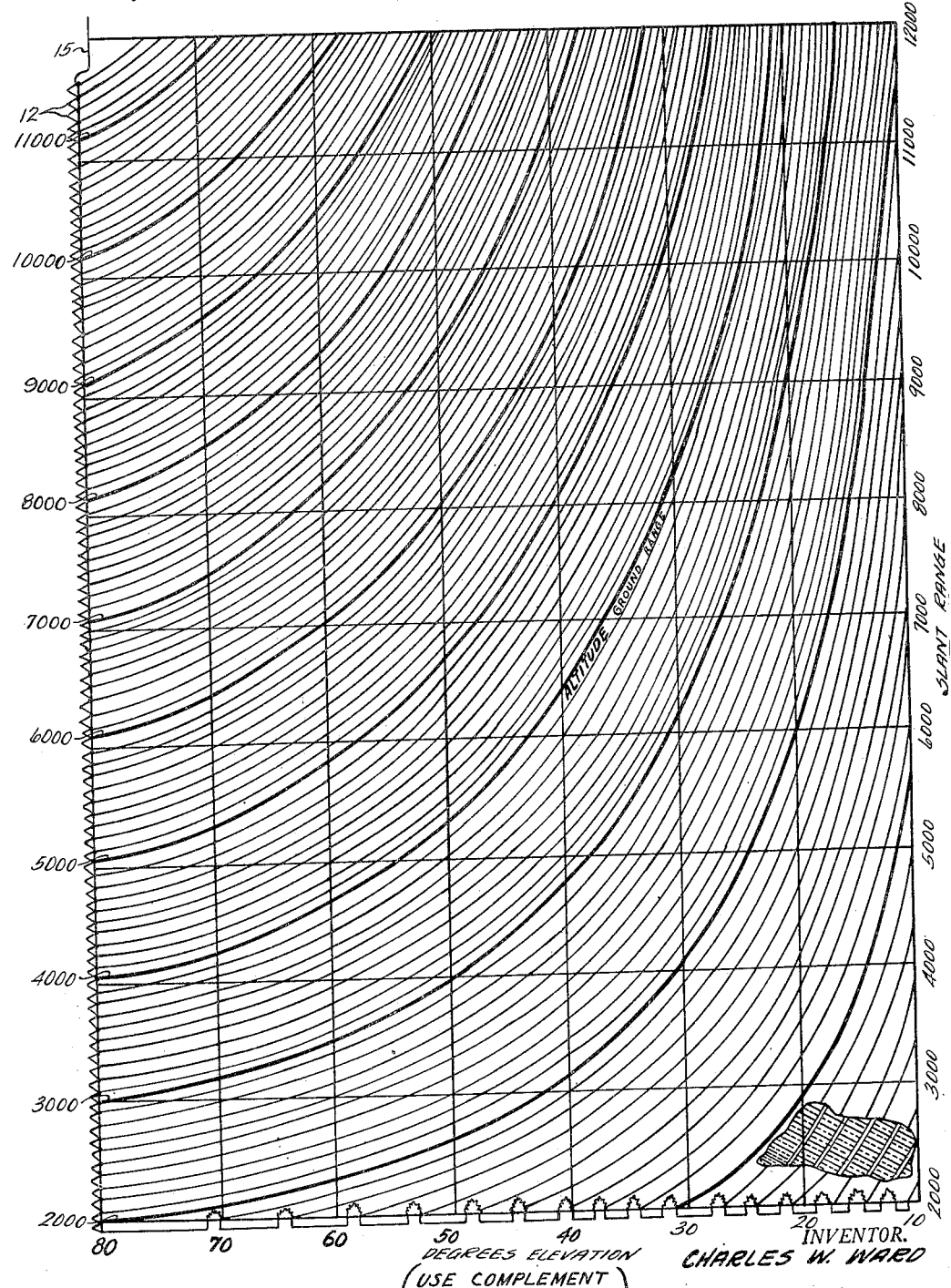
Fig. 1 is a diagrammatic illustration of a multi-contact strip sine curve potentiometer with contact strips so positioned as to compute altitude or ground range from slant range readings and degrees of elevation readings.

Refer now to the sine curve potentiometer of Fig. 1. Its function is to electrically compute altitude and ground range from the elevation and slant range readings shown by the radar set. Each curved contact strip represents 100 yards of computed altitude or ground range. The computer illustrated is capable of computing altitudes and ground ranges up to 11,500 yards, however, computers of this type may be designed for any range of altitude or ground distances for which the necessary slant range and elevation angle data can be obtained.

The slant range readings from 2,000 to 12,000 yards are shown along one axis and readings of elevation from 10 to 80 degrees are shown on the other axis of the drawing. In actual practice each curved contact strip as represented is formed of conducting material so positioned as to allow a traveling contact to pass from one strip to the adjacent one without opening the circuit. A broken section of the actual shape of the contact strips is shown in the lower left corner of Fig. 1.

Contact strips are embedded flush in insulating material and may be formed on a curved surface or a flat surface. In the present invention the sine curve potentiometer is intended to fit over three fourths of the circumference of drum 20 of Fig. 2, but for clearness in illustrating its utility, it is represented on Fig. 1 as a flat surface.

The altitude, as represented by each sine curve strip is computed by solving the trigonometric equation: $A = D \sin E$, where A is the altitude, D is the slant range and E is the angular elevation in degrees of the detected object. The sine curve contact strips act as a potentiometer, with resistance 12, made of a material having a low temperature coefficient of resistance, connected between each contact strip. Conductor 15, shown at the upper left of Fig. 1, leads from the resistor attached to the 11,500 yard altitude strip, through meter 16 of Fig. 4, to battery B—1, to ground. This meter is so calibrated that it reads in yards the altitude being computed by grounding one of the sine curve contact strips of Fig. 1.

Figure 2:
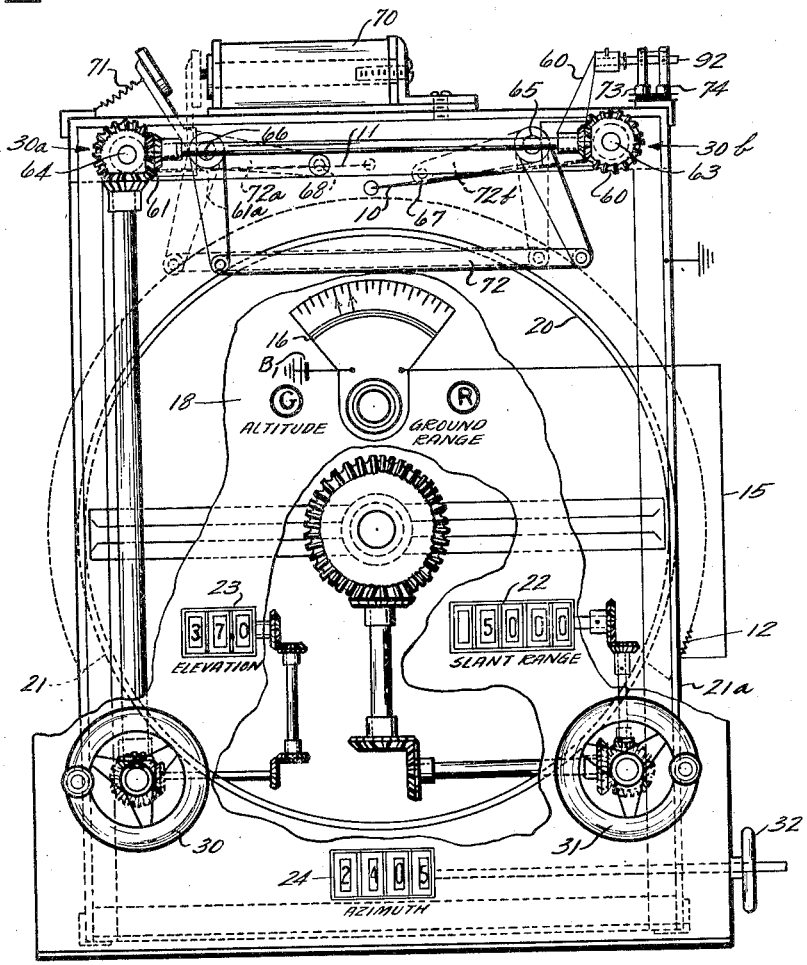
Fig. 2 is a front view of the computer and indicator with part of the front panel broken away.

Referring now to Fig. 2, drum 20 is shown with the sine curve potentiometer of Fig. 1 fitted over three quarters of its surface. It is so installed that its lowest reading of degrees of elevation is nearest the operator. The lowest reading of slant range is at point 21 and the highest reading of slant range is at point 21a.

The slant range capacity of the radar set governs the size of the sine curve potentiometer of Fig. 1, which in turn governs the diametric size of drum 20 of Fig. 2. Usually the drum is of sufficient length to accommodate elevation readings from zero to 90 degrees.

The measurement of slant range depends primarily on the ability of the radar set to measure distance in terms of time. This is usually pictured on an oscilloscope of the radar set and recorded on an indicator such as the one shown at 22 of Fig. 2.

One way of measuring elevation by a radar set is the tilted antenna method which shows the angle of elevation of a detected object on an indicator such as 23 of Fig. 2, which reads in degrees and tenths.

The azimuth indicator 24, receives its reading direct from the compass position of the radar set or its position in azimuth may be obtained by turning hand wheel 32.

Indicators 22, 23 and 24 of Fig. 2 are "Veeder" counters or ones similar to those now in use on gasoline pumps at service stations. They are mounted on the front panel of the computer and indicator as shown in this figure.

Figure 3:
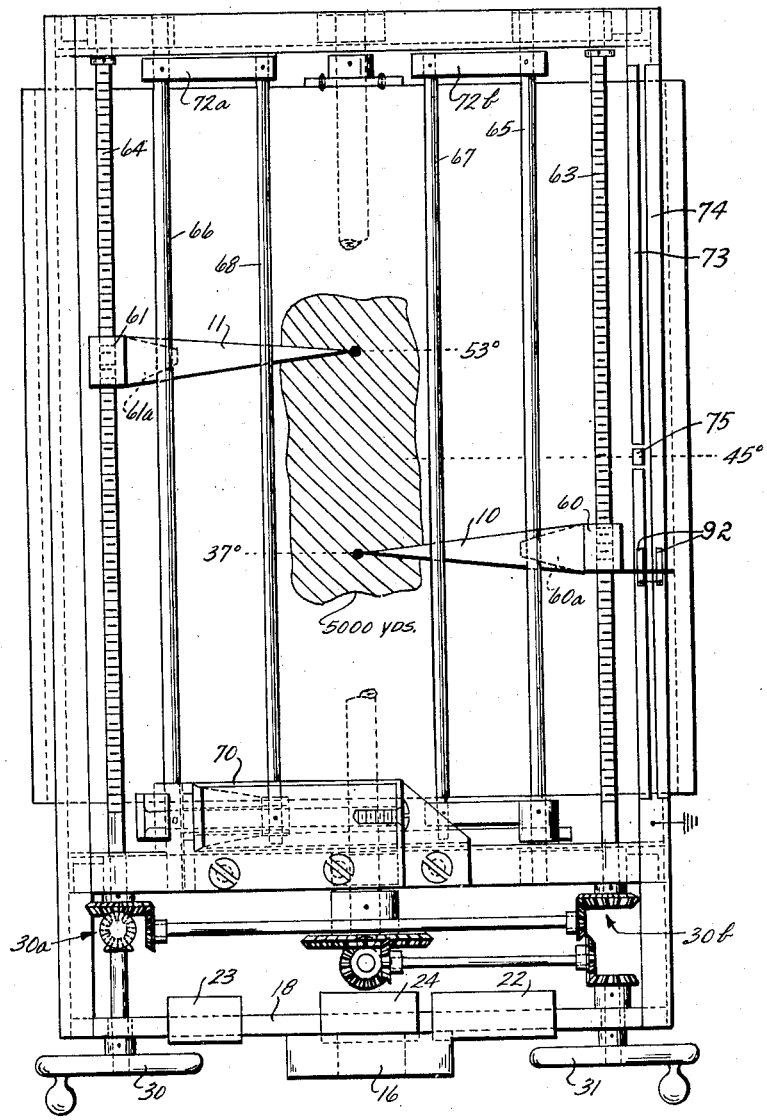
Fig. 3 is a top view of Fig. 2 with a broken section of the sine curve potentiometer of Fig. 1 showing.

Two contacts numbered 10 and 11, Figs. 2 and 3, are provided for making contact with the surface of drum 20. The lateral movement of contacts 10 and 11 on drum 20 is controlled by elevation hand wheel 30 and the rotary movement of the drum is controlled by slant range hand wheel 31.

The method of obtaining slant range and elevation of a detected object and its position in azimuth are functions of the radar set and are not claimed in this invention.

Contact 10, Fig. 2, is grounded and in electrical contact with one of the sine curve potentiometer strips. By turning either hand wheel 30 or 31, or both, contact 10 taps a voltage which is proportional to the product of slant range and the sine of the angle of elevation of the object detected by the radar set. Thus the altitude is constantly and accurately computed and indicated on meter 16 which is calibrated in yards.

As one of the main objects of my invention is to add the computation and indication of ground range to the indicating system of radar sets, by use of the same apparatus, this novel feature will now be explained.

It has been mentioned that the sine curve potentiometer of Fig. 1 was designed to represent the solved equation of slant range multiplied by the sine of the angle of elevation to give altitude. The ground range G of an object is computed by solving the trigonometric equation: $G = D \cos E$, where D is the slant range and E is the angle of elevation.

In my invention I take advantage of the fact that the cosine of an angle is the same as the sine of the complement of the angle, therefore, by furnishing an auxiliary contact, such as 11 of Figs. 2, 3 and 4 which, in reading elevation in degrees, always assumes a complementary position to contact 10 in its lateral movement over drum 20.

By providing switching means to drop contact 11 on to the sine curve potentiometer at the same instant contact 10 is released from contact with the potentiometer, the ground range of the detected object is computed and read on meter 16 of Fig. 2.

Mechanically, this is accomplished as follows: Referring to Figs. 2 and 3, contacts 10 and 11 are mounted on metal blocks 60 and 61 respectively. These blocks are threaded to fit on screw shaft 63 and 64. When elevation hand wheel 30 is turned, connections through bevel gears 30a and 30b force shafts 63 and 64 to turn in opposite directions, thereby forcing the blocks and their contacts 10 and 11 to move in opposite directions. The blocks pass each other at the 45 degree mark of the sine curve potentiometer. An extension 60a and 61a, of blocks 60 and 61 slides on rod 65 and 66 respectively. This prevents the blocks from turning when being moved along threaded shafts 63 and 64 by the turning of these shafts in either direction.

Lateral rods 67 and 68 run the length of the drum 20 and are used to throw either contact 10 or 11 in contact with the sine curve potentiometer strip directly under them. This is accomplished by relay 70. When this relay is deenergized as shown in Fig. 2, spring 71, through the armature mechanism, forces rod 67 down through movement of arms 72 and 72b. As rods 67 and 68 ride over contacts 10 and 11 during the entire length of their lateral motion, any change in position of rods 67 and 68 will affect these contacts. When rod 67 is raised, rod 68 is lowered or vice versa.

When relay 70 is energized, arm 72 of Fig. 2 moves to the left and contact 11 is forced on to the sine curve potentiometer and contact 10 is released.

Contacts 10 and 11 are ball shaped metal of high conductivity, mounted on Phosphor bronze strips which are in turn securely fastened to blocks 60 or 61. The spring tension of this material causes the contacts to assume a horizontal position, such as shown at 11 on Fig. 2, when not depressed by rod 67 or 68.

As these contacts have lateral motion in opposite directions, it is necessary to provide means to prevent them from bumping or interfering with each other which would occur if relay 70 were operated at the 45 degree point where the two contacts are located in the same vertical plane. This is accomplished electrically by providing means to prevent operation of relay 70 at this point as will now be explained in connection with the schematic wiring diagram of Fig. 4.

Relay 70 is shown in Fig. 4 in simplified form to illustrate its electrical functions. When relay 70 of Fig. 4 is deenergized, ground is connected through lower contact of armature 91 to contact 10 represented as an arrow on Fig. 4. On block 60 supporting this contact and insulated therefrom, is a multiple brush contact 92 which is in sliding contact with busses 73 and 74 and bridges these two strips.

A green light 80 is lit for altitude reading and a red light 81 is lit for ground range reading on meter 16. Multiple switch 82 and 83 is turned on for starting. Switch 84 is moved to the left for altitude reading and to the right for ground range reading. In the position shown in Fig. 4 for altitude reading, the circuit is from ground, battery B—1, switch 82, conductor 88, meter 16, conductor 15, resistance 12 of sine curve potentiometer, contact 10, armature 91 of relay 70, to ground. Another circuit runs from battery B—2, switch 83 and 84, through green light 80 to ground.

As contacts 10 and 11 approach the 45 degree line of the sine curve potentiometer, brush 92 connects segment 75 and bus 74. Current now flows through conductor 85, bus segment 75, bus 74, conductor 86, red light 81 and ground. Thus both red and green lights are lit on the 45 degree position only, as the sine and cosine for this angle is the same and the reading on meter 16 is for both altitude and ground range. Also at the 45 degree position the brushes 92 no longer connect bus 73 to bus 74 thus making it impossible to energize relay 70. As relay 70 is always deenergized at this point, the 45 degree reading will always be made by contact 10.

When ground range reading is desired, switch 84 is moved to the right. Assuming contact 10 and 11 are in the position as shown on Fig. 4, current from battery B—2 now runs through switch 83 and 84 through red light 81 to ground. Also through conductor 86, bus 74, multiple brush 92, to bus 73, through jumper 77, to upper part of bus 73, relay 70 to ground. Relay 70 now picks up armature 91 grounding contact 11 and releasing contact 10 from ground.

Now when the 45 degree line is reached in the lateral movement of contact 10 and 11, current is cut off of bus 73. Relay 70 now drops its armature and the reading for 45 degrees of elevation is read only by contact 10. As soon as contact 10 and its brush 92 moves past the 45 degree mark, current will again energize relay 70, giving the ground range reading through contact 11. It is to be noted that when brush 72 reaches the 45 degree position, current from bus 74 now flows to segment 75, through conductor 85, through green light 80 to ground. Thus, whatever position switch 84 is in, both green and red lights are lit when the 45 degree position is reached.

In the position of the contacts 10 and 11 of Fig. 4, contact 10 is grounded and the green light is lit. As this contact is opposite 37 degrees of elevation, and the drum 20 has been turned by hand wheel 31 to the 5,000 yard reading of slant range, the altitude automatically computed will be 5,000 yards times the sine of angle for 37 degrees, or 5,000 times .60182. This is 3,009 yards. On Fig. 4, contact 10 is resting on sine curve contact strip reading 3,000 yards on meter 16, which is accurate to within a very small percent.

If the operator desires a ground range reading at this time, switch 84 is thrown to the right. Relay 70 becomes energized, by a circuit just explained, and ground is removed from contact 10 and placed on contact 11. This contact is resting on an elevation reading of 53 degrees. (This is the complementary angle for 37 degrees.) As the drum is still on 5,000 yards slant range, the computed ground range will be as follows: 5,000 yards times the sine of 53 degrees (.79864) which is equal to 3,993 yards. It will be observed that contact 11 is resting on sine curve contact reading 4,000 yards, which is accurate to a very small percent.

The indicating hand of meter 16 is reading 3,000 yards for altitude and its dotted position represents 4,000 yards ground range.

Thus by manipulating hand wheels 30 and/or 31, contacts 10 and 11 are moved in opposite directions over a revolving drum and the sine curve potentiometer instantly computes the altitude or ground range of a detected object, and by movement of switch 84 either reading is indicated on meter 16.

The invention is adapted to use in computing devices that are simpler than the preceding embodiment. For example, a simple computer could be devised by constructing the sine curve potentiometer in the form of a flat surface ruled to form a coordinal area with slant range along one axis and angle of elevation along the other. A simple hand probe could then be used to ground any point of the potentiometer. To determine altitude the probe would be placed at the point on the potentiometer having the particular slant range and angle of elevation as coordinates. To determine ground range the same procedure would be followed except that in this case the complement of the angle of elevation is used.

Having thus described a direct reading computing and indicating system, it is desired to be understood that this form of the present invention has been selected to facilitate in the disclosure rather than to limit the number of forms which the invention may assume and which there has been illustrated and described a preferred embodiment of the invention, no limitation is necessarily made to the precise structural details, as other possible applications will be evident to those skilled in the art, and it is to be understood that variations and modifications which properly fall within the scope of the appended claims are contemplated and may be resorted to when found expedient.

What I claim is:

1. Means for solving the equations $A = D \sin E$ and $G = D \cos E$ comprising a plurality of conducting strips each representing a value of A, means providing an area defined by rectangular coordinates, each of said strips being insulated from the others and positioned in said area in such a way as to form the locus of all points having as coordinates values of D and E which satisfy the first-mentioned equation for the value of A represented by the strip, a resistor, means for connecting the strips to said resistor at intervals of equal resistance, a first and a second contacting means, adjusting means for moving said first contacting means to any point in said area, said adjusting means at the same time moving said second contacting means in such a way that its coordinate along the D axis is the same as that of the first contacting means and its coordinate along the E axis is equal to ninety degrees minus the value of E to which the first contacting means is set, spring means for biasing both contacting means to an inoperative position, a source of current and a current indicating means calibrated to read values of A and G connected between one end of said resistor and ground, and selective means working against the spring means for bringing one or the other of said contacting means into operative position and connecting the operative contact to ground.

2. Apparatus as claimed in claim 1, comprising in addition visual indicating means cooperative with said selective means to indicate whether values of A or G are being indicated by said current indicating means.

3. Apparatus as claimed in claim 1, comprising in addition visual indicating means cooperative with said selective means to indicate whether values of A or G are being indicated by said current indicating means, and switching means associated with said first contacting means for causing the said visual means to indicate a reading of both A and G when the contacts are set to a value of E equal to forty-five degrees.

CHARLES W. WARD.

REFERENCES CITED

The following references are of record in the file of this patent:

UNITED STATES PATENTS

| Number | Name | Date |
|---|---|---|
| 1,343,003 | Morse | June 8, 1920 |
| 2,398,904 | Libman et al. | Apr. 23, 1946 |
| 2,416,363 | Wellings | Feb. 25, 1947 |
| 2,452,664 | Koenig, Jr. | Nov. 2, 1948 |